(12) United States Patent
Björklöf et al.

(10) Patent No.: US 10,947,478 B2
(45) Date of Patent: Mar. 16, 2021

(54) PROCESS FOR PURIFYING FEEDSTOCK COMPRISING FATTY ACIDS

(71) Applicant: UPM-KYMMENE CORPORATION, Helsinki (FI)

(72) Inventors: Thomas Björklöf, Helsinki (FI); Andrea Gutierrez, Espoo (FI)

(73) Assignee: UPM-KYMMENE CORPORATION, Helsinki (FI)

(*) Notice: Subject to any disclaimer, the term of this patent is extended or adjusted under 35 U.S.C. 154(b) by 0 days.

(21) Appl. No.: 16/713,204

(22) Filed: Dec. 13, 2019

(65) Prior Publication Data
US 2020/0190426 A1    Jun. 18, 2020

(30) Foreign Application Priority Data
Dec. 14, 2018 (FI) .................. 20186086

(51) Int. Cl.
*C11B 3/00* (2006.01)
*C11B 13/00* (2006.01)

(52) U.S. Cl.
CPC .............. *C11B 3/00* (2013.01); *C11B 13/00* (2013.01)

(58) Field of Classification Search
CPC .... C10G 3/00; C10G 3/50; C11B 3/00; C11B 3/001

USPC ............................. 554/177; 44/308
See application file for complete search history.

(56) References Cited

U.S. PATENT DOCUMENTS

| | | | | |
|---|---|---|---|---|
| 2,525,892 A | * | 10/1950 | Gates | C09F 1/00 530/209 |
| 2,791,577 A | * | 5/1957 | Outterson | C11B 13/005 530/209 |
| 2011/0049012 A1 | * | 3/2011 | Stigsson | C11B 3/10 208/88 |

FOREIGN PATENT DOCUMENTS

| | | |
|---|---|---|
| CN | 101619274 A | 1/2010 |
| FI | 124885 B | 3/2015 |
| WO | 2009072468 A1 | 6/2009 |
| WO | 2010021753 A1 | 2/2010 |
| WO | 2010097519 A2 | 9/2010 |
| WO | 2018060324 A1 | 4/2018 |

* cited by examiner

*Primary Examiner* — Deborah D Carr
(74) *Attorney, Agent, or Firm* — Cantor Colburn LLP

(57) ABSTRACT

The present invention relates to process for purifying renewable feedstock comprising at least one acidulated soapstock, wherein said process comprises the steps, where the renewable feedstock comprising at least one fatty acid is treated in a treating step with an aqueous medium, and a first stream comprising water and a second stream comprising fatty acids are obtained, and the second stream is obtained as purified renewable feedstock.

27 Claims, 4 Drawing Sheets

PROCESS FOR PURIFYING FEEDSTOCK COMPRISING FATTY ACIDS

CROSS-REFERENCE TO RELATED APPLICATION

This application claims benefit of Finnish Patent Application No. 20186086 filed on Dec. 14, 2018, which is incorporated by reference herein in its entirety.

FIELD OF THE INVENTION

The present invention relates to a process for purifying renewable feedstock comprising fatty acids. The feedstock, particularly feedstock originating from renewable materials, is subjected to purification where impurities are removed. The purified feedstock comprising fatty acids may be used in the manufacture of products comprising hydrocarbons, suitable as fuels or fuel components. The purified feedstock comprising fatty acids is suitable as feed for biofuel production.

BACKGROUND OF THE INVENTION

There is an increasing interest in alternative feedstocks for replacing at least partly crude oil, in the production of hydrocarbons, suitable as fuels or fuel components, for example as transportation fuels, or compatible with fuels. Biofuels are typically manufactured from feedstock originating from renewable sources including oils and fats obtained from plants, animals, algal materials, fish, and various waste streams, side streams and sewage sludge. These feedstocks, particularly the various waste streams and side streams, contain varying amounts of contaminants, such as gums, phospholipids and other phosphorus compounds, metals and metal compounds, and residual soaps, which are, for example, deleterious to converting catalysts.

Plant oils and animal fats are conventionally pretreated with degumming, evaporation and/or bleaching processes, which are designed to remove or at least minimize the content of contaminants in said materials. Lye is often used for saponification of fatty acids whereby they are separated alongside with impurities, such as phosphorus compounds. Bleaching generates significant amounts of spent bleaching earth as waste. Further, both processes entail a yield loss, as oil is removed with the impurities.

Despite the ongoing research and development in the processing of renewable feedstocks and manufacture of fuels, there is still a need to provide an improved process for purifying renewable feedstock comprising fatty acids to provide purified feedstock, which is suitable for converting to valuable chemicals, such as hydrocarbons suitable as fuels or fuel blending components.

SUMMARY OF THE INVENTION

An object of the invention is to provide a process for purifying renewable feedstock comprising fatty acids.

One aspect is a process for purifying renewable feedstock comprising at least one fatty acid, where said process comprises the steps, where the renewable feedstock comprising at least one fatty acid is treated in a treating step with an aqueous medium at the temperature from 150 to 210° C., under a pressure from 5 to 70 bar (abs), where the ratio of the renewable feedstock comprising at least one fatty acid to the aqueous medium is from 1:5 to 5:1, respectively, and a first stream comprising water and a second stream comprising oil are obtained, and the second stream is obtained as purified renewable feedstock.

Another aspect provides purified renewable feedstock, comprising oil obtained by said process.

Characteristic features of the invention are presented in the appended claims.

Definitions

Fatty acids refer here to C4-C26 fatty acids, typically present in feedstocks originating from renewable sources.

The fatty acids refer here to fatty acids that are present as free fatty acids, and/or as bound derivatives, such as esters or acylglycerols or other bound derivatives of said acids.

The term "acylglycerol" refers here to esters formed from glycerol and fatty acids, linked by acylglyceride linkage between the fatty acid and at least one of the hydroxyl groups of glycerol.

Acidulated soap-stocks refer here to oils and fats comprising free fatty acids and residual soaps, i.e. metal salts of alkali metal, earth alkaline metal and metals of the groups VIIB and VIIIB of the Periodic table of elements with fatty acids, typically obtained from pulp production, or as a result of acidulation of plant oils or animal fats.

The term "unsaponifiables" refers here to substances which cannot be saponified by caustic treatment, such as higher aliphatic alcohols, sterols, and hydrocarbons, particularly fatty alcohols (C20-C24), sterols (C30) and carotenes, and various other alkyl- and cycloalkyl hydrocarbon derivatives (C10-C30).

The term "first stream" refers here to a stream comprising water. The first stream is an aqueous stream or aqueous phase, which is separated from the mixture obtained in the process, where the renewable feedstock comprising fatty acids is treated with the aqueous medium. The first stream comprises water and it may comprise water soluble and water miscible compounds, particularly impurities separated from the renewable feedstock.

The term "second stream" refers here to an oil stream or oil phase, which is separated from the mixture obtained in the step, where the renewable feedstock comprising at least one fatty acid is treated with the aqueous medium. The second stream typically comprises fatty acids, and/or acylglycerols, and optionally unsaponifiables, if they were present in the feedstock.

Transportation fuels refer here to fractions or cuts or blends of hydrocarbons having distillation curves standardized for fuels, such as for diesel fuel (middle distillate from 160 to 380° C., according to EN 590), gasoline (40-210° C., according to EN 228), aviation fuel (160 to 300° C., according to ASTM D-1655 jet fuel), kerosene, naphtha, etc. Liquid fuels are hydrocarbons having distillation curves standardized for fuels, such as transportation fuels.

The term "biofuel" refers here to liquid fuels obtained from renewable feedstock, e.g. feedstock of biological origin.

DETAILED DESCRIPTION OF THE INVENTION

Figure 1:
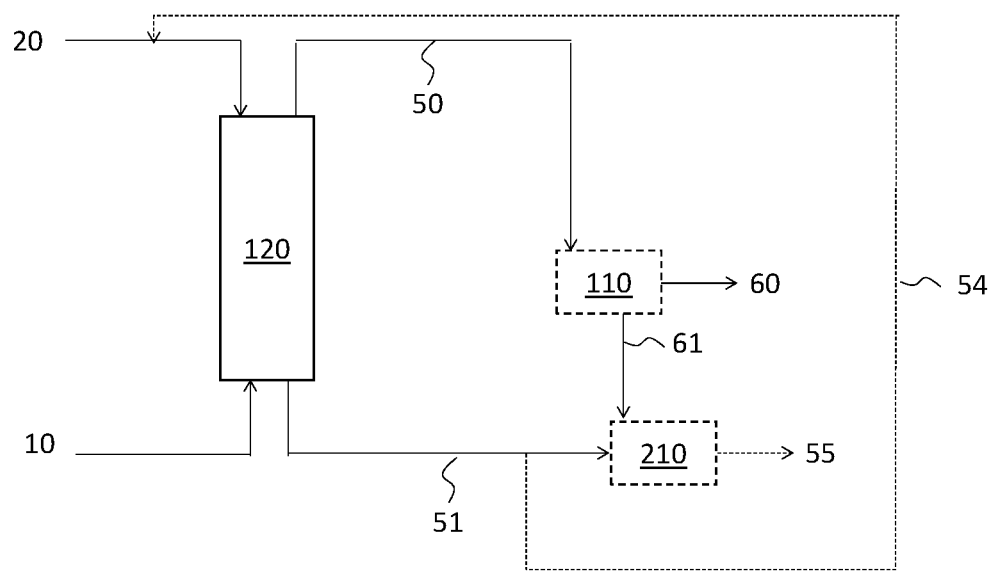
FIG. 1 is a schematic flow diagram representing one embodiment of the purification process.

An industrially effective and sustainable process for purifying renewable feedstock comprising at least one fatty acid is provided, where various impurities, including phosphorus, silicon, alkali metals, alkaline earth metals and other metals can be removed from the feedstock effectively and economically, while maintaining the structure of valuable compounds. The purified renewable feedstock is particularly suitable as feedstock for hydroprocessing in biofuel manufacture. The purification process releases effectively moieties containing particularly phosphorus, silicon, alkali metals, alkaline earth metals and other metals from compounds present in the feedstock, without breaking or degrading valuable feed materials or without effecting hydrolysis of acylglycerols, or at least maintaining said hydrolysis on a very negligible level. The valuable organic compounds are maintained in the oil phase, confirmed by low total organic carbon (TOC) in the aqueous phase, and the impurities are typically present in the aqueous phase. The process is particularly suitable for purifying low grade oils, waste oils, residue oils and the like, comprising fatty acids and it provides an improved alternative for purifying methods, such as degumming and bleaching of oils.

One aspect is a process for purifying renewable feedstock comprising at least one fatty acid, where said process comprises the steps, where the renewable feedstock comprising at least one fatty acid is treated in a treating step with an aqueous medium, at the temperature from 150 to 210° C., under a pressure from 5 to 70 bar (abs), where the ratio of the renewable feedstock comprising at least one fatty acid to the aqueous medium is from 1:5 to 5:1, respectively, and a first stream comprising water and a second stream comprising oil are obtained, and the second stream is obtained as purified renewable feedstock.

In an embodiment, the purified renewable feedstock comprises not more than 50 mg/kg phosphorus, calculated as elemental phosphorus.

In a preferable embodiment, the purified renewable feedstock comprises not more than 10 mg/kg phosphorus, preferably not more than 5 mg/kg phosphorus, more preferably not more than 1 mg/kg phosphorus, calculated as elemental phosphorus.

In an embodiment, the purified renewable feedstock comprises not more than 20 mg/kg silicon, calculated as elemental silicon.

In an embodiment, the purified renewable feedstock comprises not more than 10 mg/kg silicon, preferably not more than 5 mg/kg silicon, calculated as elemental silicon, more preferably not more than 1 mg/kg silicon.

In an embodiment, the purified renewable feedstock comprises not more than 100 mg/kg of alkali metals, alkaline earth metals, metals of the groups VIIB and VIIIB of the Periodic table of elements or combinations thereof, calculated as elemental metals, in total.

In an embodiment, the purified renewable feedstock comprises not more than 50 mg/kg alkali metals, alkaline earth metals, metals of the groups VIIB and VIIIB of the Periodic table of elements (other metals), or combinations thereof, calculated as elemental metals, in total, preferably not more than 20 mg/kg, more preferably not more than 10 mg/kg, even more preferably not more than 5 mg/kg.

In an embodiment, the first stream comprising water comprises not more than 10 000 mg/kg total organic carbon. The total organic carbon (TOC) is measured using SFS-EN 1484 standard method.

In an embodiment, the purified renewable feedstock comprises not more than 10 mg/kg phosphorus, not more than 10 mg/kg silicon and not more than 10 mg/kg alkali metals, alkaline earth metals, metals of the groups VIIB and VIIIB of the Periodic table of elements, or combinations thereof and the first stream comprising water comprises not more than 10 000 mg/kg total organic carbon.

Accordingly, the renewable feedstock comprising at least one fatty acid is subjected to purification with an aqueous medium, whereby a first stream comprising water, phosphorus containing moieties, silicon containing moieties, alkali metals, alkaline earth metals, metals of the groups VIIB and VIIIB of the Periodic table of elements, such as Fe and Mn, and possibly some water soluble or water miscible organic compounds are separated from a second stream. The second stream may comprise fatty acids and/or acylglycerols, some residual water, and unsaponifiables, if contained in the feedstock.

In said process, the pressure is adjusted to maintain water in the liquid phase at the selected temperature.

In an embodiment, said process comprises the steps, where the renewable feedstock comprising at least one fatty acid is treated in the treating step with an aqueous medium, at the temperature from 150 to 210° C., under a pressure from 5 to 60 bar (abs), where the ratio of the renewable feedstock comprising at least one fatty acid to the aqueous medium is from 1:5 to 5:1, respectively, and a first stream comprising water and a second stream comprising oil are obtained, and the second stream is obtained as purified renewable feedstock.

In an embodiment, said process comprises the steps, where the renewable feedstock comprising at least one fatty acid is treated in the treating step, with an aqueous medium, at the temperature from 150 to 200° C., under a pressure from 5 to 30 bar (abs), where the ratio of the renewable feedstock comprising at least one fatty acid to the aqueous medium is from 1:5 to 5:1, respectively, and a first stream comprising water and a second stream comprising oil are obtained, and the second stream is obtained as purified renewable feedstock.

In an embodiment, said process comprises the steps, where the renewable feedstock comprising at least one fatty acid is treated in the treating step with an aqueous medium at the temperature from 155 to 205° C., preferably from 155 to 200° C., and more preferably from 155 to 195° C.

In an embodiment, said process comprises the steps, where the renewable feedstock comprising at least one fatty acid is treated in the treating step with an aqueous medium under the pressure from 5.5 to 70 bar (abs), preferably from 5.5 to 60 bar (abs), more preferably from 5.5 to 30 bar (abs).

In an embodiment, the process comprises the steps, where the renewable feedstock comprising at least one fatty acid is treated with an aqueous medium comprising an acid selected from sulfuric acid and C1-C10 organic acids.

In an embodiment, the process comprises an additional pretreatment step, where the renewable feedstock comprising at least one fatty acid is pretreated with an aqueous medium at the temperature of 90-145° C. Pretreating refers here to treating at lower temperature of 90-145° C.

In an embodiment, the process comprises the steps, where the renewable feedstock comprising at least one fatty acid is pretreated with an aqueous medium comprising an acid selected from sulfuric acid and C1-C10 organic acids.

In an embodiment, the process comprises a pretreatment step followed by the treating step, where the renewable feedstock comprising at least one fatty acid is pretreated with an aqueous medium, where the ratio of the renewable feedstock comprising at least one fatty acid to the aqueous medium is from 1:5 to 5:1, at the temperature of 90-145° C., under a pressure of 0.1-10 bar (abs), and a first-stage aqueous stream is separated from a first-stage oil stream, and the first-stage oil stream, i.e. the pretreated feedstock, is treated in the treating step with water at the temperature of 150-210° C., under a pressure of 5-70 bar (abs), and a first stream comprising water and a second stream comprising fatty acids are obtained, and the second stream is obtained as purified renewable feedstock.

In an embodiment, the process comprises the steps, where the renewable feedstock comprising at least one fatty acid is pretreated followed by treating the pretreated feedstock with an aqueous medium in the treating step, where, in the pretreatment step the renewable feedstock comprising at least one fatty acid is pretreated with an aqueous medium comprising an acid selected from sulfuric acid and C1-C10 organic acids, where the ratio of the renewable feedstock comprising at least one fatty acid to the aqueous medium is from 1:5 to 5:1, respectively, at the temperature of 90-145° C., under a pressure of 0.1-10 bar (abs), and a first-stage aqueous stream is separated from a first-stage oil stream, and, in the treating step said first-stage oil stream (pretreated feedstock) is treated with water at a higher temperature, the temperature of 150-210° C., under a pressure of 5-70 bar (abs), and a first stream comprising water and a second stream comprising oil are obtained, and the second stream is obtained as purified renewable feedstock.

In an embodiment, the process comprises the steps, where the renewable feedstock comprising at least one fatty acid is pretreated followed by treating the pretreated feedstock with an aqueous medium in the treating step, where in the pretreatment step the renewable feedstock comprising at least one fatty acid is pretreated with an aqueous medium comprising an acid selected from sulfuric acid and C1-C10 organic acids, where the ratio of the renewable feedstock comprising at least one fatty acid to the aqueous medium is from 1:5 to 5:1, and where the amount of the acid is 0.01 to 3 wt % calculated based on the total feed to the reactor, at the temperature of 90-145° C., under a pressure of 0.1-10 bar (abs), and a first-stage aqueous stream is separated from a first-stage oil stream, and, in the treating step said first-stage oil stream (pretreated feedstock) is treated with water at the temperature of 150-210° C., under a pressure of 5-70 bar (abs), and a first stream comprising water and a second stream comprising oil are obtained, and the second stream is obtained as purified renewable feedstock.

In this embodiment, which comprises a pretreatment step at the temperature of 90-145° C. and a treating step, with water at the temperature of 150-210° C., the acid is used in the pretreatment step only, at low temperatures, whereby the corrosive effect of the acid is reduced.

In an embodiment, in the pretreatment step the temperature of is from 95 to 140° C.

In an embodiment, in the pretreatment step the pressure is from 0.5 to 5.5 bar (abs).

In an embodiment, comprising the pretreatment step, in the treating step the temperature is from 155 to 200° C., preferably from 155 to 195° C.

In an embodiment, comprising the pretreatment step, in the treating step, the pressure is from 6 to 25 bar (abs).

In an embodiment, the process comprises the steps, where the renewable feedstock comprising at least one fatty acid is treated in a pretreatment step followed by the treating step, and the first stream comprising water is recirculated to the aqueous medium comprising the acid.

In an embodiment, the process comprises the steps, where the renewable feedstock comprising at least one fatty acid is treated in a pretreatment step and in a treating step, the first stream comprising water is directed to waste water treatment to obtained purified water, which purified water is recirculated to the aqueous medium comprising the acid.

In an embodiment, the second stream comprising oil, is subjected to a fractionation step. A gaseous fraction, if any, a light liquid fraction and a heavy liquid fraction may be obtained.

The gaseous fraction typically comprises water and C1-C4 compounds.

The light liquid fraction typically comprises fatty acids having carbon number C4-C26. The light liquid fraction may optionally comprise also acylglycerols and/or esters and unsaponifiables, if contained in the feedstock.

The heavy liquid fraction typically comprises compounds having carbon number of at least C24 or higher and polymerized compounds.

In an embodiment, the second stream comprising oil is directed to a hydroprocessing step.

In another embodiment, the light liquid fraction, obtained by fractionation of said second stream, is directed to a hydroprocessing step.

In FIG. 1 an aqueous medium (20) and acid oil (acidulated soap-stock) (10) are fed to a purification step (120), where purification and separation are carried out, suitably in an extraction column, by treating acid oil (10) with said aqueous medium (20), optionally in the presence of steam (not shown in the figure). A first stream (aqueous stream) comprising impurities (51) is obtained and optionally directed to waste water treatment (210) to obtain purified water (55), and a second stream comprising oil (50) is obtained. Said stream (50) is optionally directed to drying (110). In the drying (110) water (61) is separated and optionally directed to waste water treatment (210) and a dried second stream comprising oil (60) is obtained. Optionally, at least part (54) of the aqueous stream (51) may be recirculated to the aqueous medium (20). The dried second stream comprising oil (60) may optionally be directed to storage and/or hydroprocessing (not shown in the figure).

Figure 2:
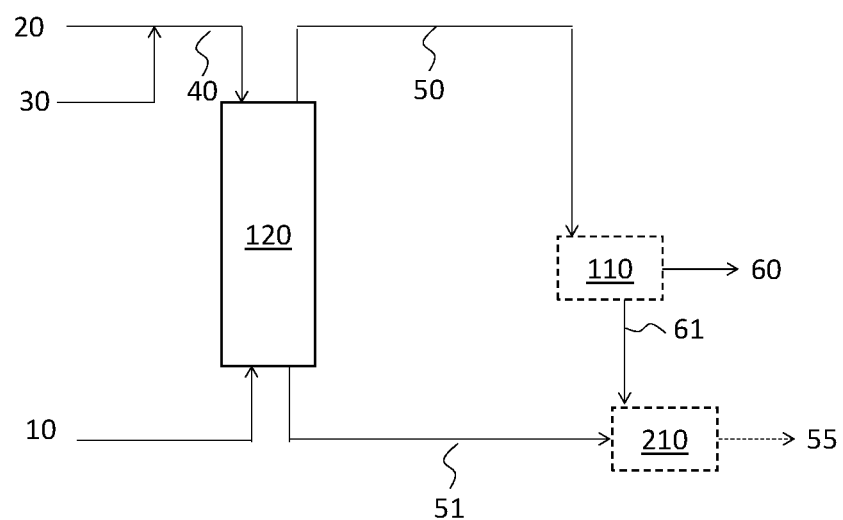
FIG. 2 is a schematic flow diagram representing another embodiment of the purification process.

In FIG. 2 an acid (30) is fed to an aqueous medium (20) to obtain an aqueous medium comprising an acid (40). Said aqueous medium comprising an acid (40) and animal fat (10) are fed to a purification step (120), where purification and separation are carried out, suitably in an extraction column, by treating animal fat (10) with said aqueous medium comprising an acid (40), optionally in the presence of steam (not shown in the figure). A first stream (aqueous stream) comprising impurities (51) is obtained and optionally directed to waste water treatment (210) to obtain purified water (55), and a second stream comprising oil (50) is obtained. Said stream (50) is optionally directed to drying (110). In the drying (110) water (61) is separated and optionally directed to waste water treatment (210) and a dried second stream comprising oil (60) is obtained. Optionally, at least part of the aqueous stream (51) may be recirculated to the aqueous medium (20) (not shown in the figure). The dried second stream comprising oil (60) may optionally be directed to storage and/or hydroprocessing (not shown in the figure).

Figure 3:
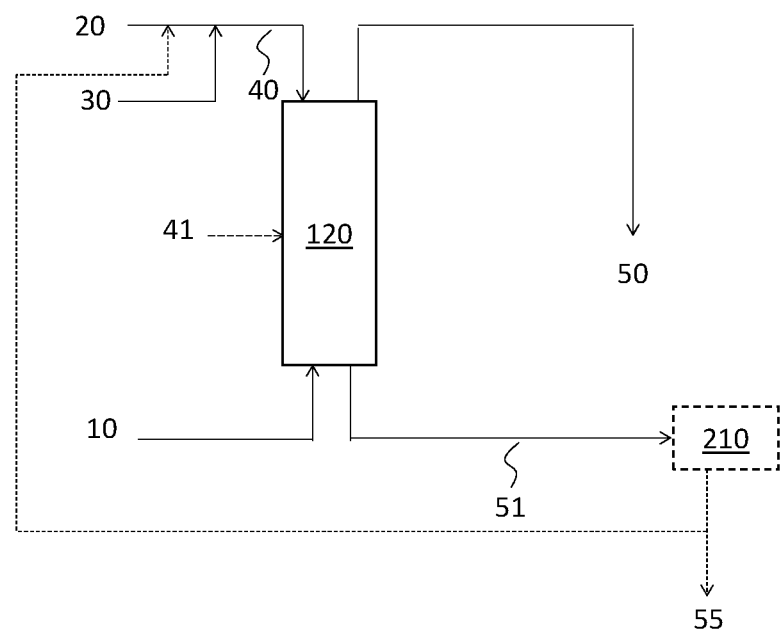
FIG. 3 is a schematic flow diagram representing another embodiment of the purification process.

In FIG. 3 an acid (30) is fed to an aqueous medium (20) to obtain an aqueous medium comprising an acid (40). Said aqueous medium comprising an acid (40) and acid oil (10)

are fed to a purification step (120), where purification and separation are carried out, suitably in an extraction column, by treating acid oil (10) with said aqueous medium comprising an acid (40), optionally in the presence of steam (41). A first stream (aqueous stream) comprising impurities (51) is obtained and optionally directed to waste water treatment (210) and a second stream comprising triglycerides acids (50) is obtained. Waste water treatment (210) provides purified water (55), where at least part of it may optionally be recirculated to the aqueous medium (40).

Figure 4:
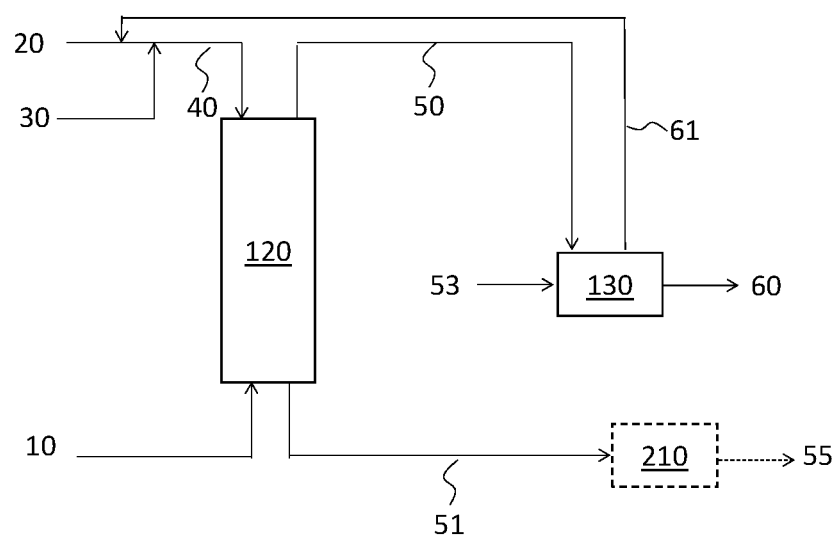
FIG. 4 is a schematic flow diagram representing another embodiment of the purification process.

In FIG. 4 an acid (30) is fed to an aqueous medium (20) to obtain an aqueous medium comprising an acid (40). Said aqueous medium comprising an acid (40) and acid oil (10) are fed to a pretreatment step (120), where pretreatment (wash/purification and separation) is carried out, suitably in an extraction column, by pretreating acid oil (10) with said aqueous medium comprising an acid (40), optionally in the presence of steam (not shown in the figure). A first-stage aqueous stream (51) is separated and optionally directed to waste water treatment (210). Waste water treatment (210) provides purified water (55), where at least part of it may optionally be recirculated to the aqueous medium (not shown in the figure). A first-stage oil stream (50) is directed to the treating step (130), where said first-stage oil stream (50) is treated with water (53), and a first stream comprising water (61) and a second stream comprising oil (60) are obtained, and the second stream (60) is obtained as purified renewable feedstock.

Renewable Feedstock Comprising Fatty Acid

The renewable feedstock comprising fatty acid originates from renewable or biological source or sources, and it is meant to include here feedstock other than those obtained from mineral oil or coal.

The renewable feedstock comprises at least one fatty acid.

In an embodiment, the renewable feedstock comprising fatty acids comprises 7-99.5% by weight of at least one fatty acid.

In an embodiment, the renewable feedstock comprising fatty acids, comprises 10-99.5% by weight of at least one fatty acid.

In another embodiment, the renewable feedstock comprising fatty acids, comprises 20-95 wt % of at least one fatty acid.

In another embodiment, the renewable feedstock comprising fatty acids, comprises 40-95 wt % of at least one fatty acid.

In an embodiment, the fatty acids refer here to fatty acids that are present as free fatty acids, or alternatively as bound derivatives, such as esters or acylglycerols or other bound derivatives of said fatty acids.

In an embodiment, the fatty acids refer here to fatty acids that are present as free fatty acids, as acylglycerols (such as triglycerides), or any combinations thereof.

The renewable feedstock comprising fatty acids is selected from the group consisting of acidulated soap-stocks, fatty acid distillates from physical refining of plant oils or animal fats, distillers corn oil (DCO) from ethanol production, waste cooking oils, lard, brown grease, trap grease, waste fats, low-grade oils, super critical water liquefaction oils (SCWL oils), pyrolysis oils, plant oils, animal fats and any combination thereof.

The renewable feedstock comprising fatty acids may originate for example from plants, animals, algae (algae oil, algae biomass, algae cultivation), fish and microbiological processes. For example, SCWL oils obtained from algae oil or biomass, comprise fatty acids.

Examples of such feedstocks are lipidic biomass feedstocks originating from low cost renewable waste materials, side streams, by-products, refining waste and residues, sewage sludge, and any combinations thereof.

Said renewable feedstocks typically contains varying amounts of impurities, such as metals, water, phosphorus, silicon, alkali metals, earth alkaline metals, lignin, etc.

Acidulated soap-stock refers here to acidic oil fractions obtained from the processing and/or refining of plant derived and/or animal derived fractions comprising free and/or bound fatty acids, and any combinations thereof. Acidulated soap-stocks are acidulated soaps obtained from chemical refining of plant material, acidulated soaps from chemical refining of plant oils, acidulated soaps from chemical refining of animal fats, and acidulated soap-stocks from pulp production (Kraft pulp). Examples of acidulated soap-stocks are acid oils and crude tall oil. Acidulated soap-stocks contain typically free fatty acids in an amount of at least 10 wt %. Acidulated soap-stocks contain long chain fatty acids typically having carbon number between C8 and C24, mainly between C16 and C18, mineral acids, phospholipids and sterols. Acidulated soap-stocks are cheap and readily available by-products in significant quantities, obtainable particularly from plant oil refining and wood processing.

Crude tall oil (CTO) is obtained from Kraft pulping of wood, especially coniferous wood, and it is mainly composed of saturated and unsaturated oxygen-containing organic compounds such as resin acids (mainly abietic acid and its isomers), fatty acids (mainly linoleic acid, oleic acid and linolenic acid), unsaponifiables, such as fatty alcohols, sterols and other alkyl hydrocarbon derivatives, as well as impurities. The composition of CTO varies to a great deal, depending on the type of wood used. The handling and cooking of the wood causes break down of the triglyceride structures and hence CTO does not contain any significant amounts of triglycerides. Typically, CTO contains impurities such as inorganic sulfur compounds, alkali metal compounds, residual metals such as Na, K, Ca, Fe, and Si and P. In CTO, phosphorus typically exists in phospholipids and nucleotides. CTO may contain from 35 to even close to 100 wt % of free fatty acids, typically from 40 to 70 wt %.

Typically, acidulated soap-stocks comprise high amounts of impurities. Acidulated soap-stocks comprise phosphorus, silicon, alkali metals, alkaline earth metals, metals of the groups VIIB and VIIIB of the Periodic table of elements, such as iron and manganese, which are difficult and/costly to remove, and they cause problems in catalytic treatment of said feedstocks.

Acidulated soap-stock containing even high amounts of impurities may be successfully used as feedstock in the present process. Acidulated soap-stock has typically lower density than that of many other renewable feedstocks.

Acidulated soap-stock comprising phosphorus is regarded as not suitable for catalytic treatment because phosphorus is an effective catalyst poison. It is generally regarded as difficult and uneconomic to remove phosphorus from acid oils comprising high amounts of free fatty acids. Phosphorus may be bound in phospholipids (gums) and/or in other compounds, which are particularly difficult to remove by methods such as degumming or other conventional pretreatment methods. In degumming, NaOH is typically used for adjusting the pH to a suitable range for removing phosphorus. NaOH forms soaps with free fatty acids, which leads to yield losses. Acidulated soap-stocks may comprise even more than 1 000 mg/kg of phosphorus.

Acidulated soap-stocks comprising one or more of alkali metals, alkaline earth metals, and metals of the groups VIIB and VIIIB of the Periodic table of elements, even in low amounts is regarded as not suitable for catalytic treatment because each of said metals is an effective catalyst poison. The alkali metals, alkaline earth metals and metals may typically be any one of Na, Mg, Ca, K, Na, Mn and Fe, or a combination thereof.

In an embodiment, acidulated soap-stock comprising up to 1000 mg/kg of phosphorus may successfully be used as feedstock. In an embodiment, acidulated soap-stock comprising up to 500 mg/kg of phosphorus may successfully be used as feedstock. In an embodiment, acidulated soap-stock comprising up to 250 mg/kg of phosphorus, may successfully be used as feedstock.

In an embodiment, acidulated soap-stock comprising up to 5000 mg/kg, in total, of one or more of alkali metals, and alkaline earth metals and metals of the groups VIIB and VIIIB of the Periodic table of elements may successfully be used as feedstock.

In an embodiment, acidulated soap-stock comprising up to 100 mg/kg of silicon, may successfully be used as feedstock.

The renewable feedstock comprising fatty acids is subjected purification to obtain a stream comprising oil (second stream) and an aqueous stream (first stream) comprising impurities. The purification process removes effectively the impurities but maintains the valuable organic compounds in the stream comprising oil, without effecting hydrolysis of acylglycerols to any significant extent.

In the purification, the renewable feedstock comprising fatty acid, is treated with an aqueous medium.

Said aqueous medium comprises water, mixtures of water and steam, or mixtures of streams comprising water or water and steam, with water soluble and/or water miscible organic compounds. Said water soluble and/or water miscible organic compounds may be water soluble ketones, alcohols, aldehydes, phenols etc. Suitably said aqueous medium comprises water.

Said aqueous stream (water streams) may be recirculated by recirculating at least part of streams comprising water, obtained from the present process, to the aqueous medium or alternatively first to waste water purification, and then as purified water stream to the aqueous medium.

The aqueous medium may comprise 90-100 wt %, preferably 93-100 wt % and particularly preferably 97-100 wt % of water.

In an embodiment, the aqueous medium may comprise not more than 50 mg/kg phosphorus (P), not more than 50 mg/kg silicon (Si) and not more than 50 mg/kg of at least one of alkali metals, alkaline earth metals and metals of the groups VIIB and VIIIB of the Periodic table of elements.

In an embodiment, where recirculated streams comprising water are used, the aqueous medium may comprise not more than 3 wt % of water soluble and/or water miscible organic compounds, suitably 0.01-3 wt %. Said water soluble and/or water miscible organic compounds may be water soluble ketones, alcohols, aldehydes, phenols, acids etc., separated in the purification. Examples of such compounds are acetone, ethanol, 1-hydroxy-2-propanone, acetic acid, propanoic acid, butanoic acid, pentanoic acid, hexanoic acid, phenol, traces of larger acid e.g. octadecanoic acids, hexadecanoic acid, and glycerol.

In an embodiment, the aqueous medium comprises an acid selected from sulphuric acid and C1-C10 organic acids. The amount of the acid is from 0.01 to 3 wt % calculated based on the total feed to the reactor, i.e on the renewable feedstock comprising fatty acids. The amount of the acid is calculated as 100%.

The total amount of the acid is not more than 3 wt %. Preferably the amount of the acid is 0.1-2 wt %, particularly preferably 0.5-1.5 wt %.

The C1-C10 organic acid is preferably EDTA or C1-C6 organic acid selected from citric acid, formic acid, oxalic acid, acetic acid, butyric acid, valeric acid, caproic acid and propionic acid.

In a preferable embodiment the acid is sulfuric acid. In an embodiment sulphuric acid having concentration of 96 wt % is used.

In an embodiment, the feedstock is treated with the aqueous medium comprising an acid, and a first stream is separated, whereby the pH of the first stream is in the range from 0 to 6.5, preferably from 0.1 to 4. In a more preferable embodiment, the pH of the first stream is from 0.1 to 3.7.

In an embodiment, where a two-step process is used, comprising a pretreatment step and a treating step, a first-stage aqueous stream is separated, having a pH in the range from 0 to 6.5, preferably from 0.1 to 4, more preferably from 0.1 to 3.7.

In a preferable embodiment the acid is mixed with the aqueous medium prior to mixing with the feedstock.

The low pH range enables removing alkali metals, alkaline earth metals and other metals from the feedstock efficiently and rapidly.

In an embodiment, in the purification, the amount of the renewable feedstock comprising fatty acids, is from 20 to 80 wt % and the amount of the aqueous medium is 80 to 20 wt %, respectively, and the ratio is from 1:5 to 5:1, respectively and preferably from 1:1 to 3:1.

The purification may be carried out as a batch process or as a continuous process.

The purification process may be carried out in any suitable reactor or reactor configuration, such as batch reactor, plug-flow reactor, stirred tank reactor, a reactor tower, column reactor, or counter current extraction column. When a two-step process is used, the reactor may be of same type or different. In an embodiment two extraction columns may be used.

In an embodiment, the purification is carried out as a continuous countercurrent process, suitably using an extraction column. A continuous countercurrent purification of the feedstock is particularly suitable for larger industrial scale.

In an embodiment, the total residence time in the purification is from 10 min to 12 hours. In another embodiment, the residence time is from 10 min to 7 hours.

An aqueous stream (first stream) comprising impurities and a stream comprising oil (second stream) are separated from the mixture obtained from the purification. The purification and separation may be carried out simultaneously, for example using an extraction column, or alternatively using any suitable method based on gravitational separation or separation by centrifugal force. Examples of suitable separation devices are separation vessels, decantation vessels, decanters and disk stack centrifuges.

The second stream comprising oil may comprise fatty acids, acylglycerols, unsaponifiables, such as sterols, carotenes, etc., depending of the composition of the feedstock.

The aqueous stream (first stream) typically comprises P, Si, alkali metal, alkaline earth metal and other metal impurities, and some water-soluble or water-miscible organic compounds, if any. Said organic compounds may be water soluble ketones, alcohols, aldehydes, phenols, acids etc. Examples of such compounds are acetone, ethanol, 1-hydroxy-2-propanone, acetic acid, propanoic acid, butanoic acid, pentanoic acid, hexanoic acid, phenol, traces of larger acid e.g. octadecanoic acids, hexadecanoic acid and glycerol.

In an embodiment, at least part of the aqueous stream (first stream) is recycled to the aqueous medium, whereby the amounts of waste water streams can be reduced. In an embodiment, the first stream may be purified in water treatment prior to recycling it.

The process may be carried out under inert atmosphere, using suitably $N_2$ or $CO_2$ atmosphere.

The water used in the process, as such and in the aqueous medium is suitably de-aerated and demineralized or softened prior to introducing to the process.

In an embodiment, steam may be used for providing energy to the purification, for improving mixing in the purification vessel, replacing part of the water in the aqueous medium and for maintaining the temperature. Steam may be introduced in the purification step.

The feed rate of steam is up to 500 kg/t feed, suitably 30-500 kg/t feed, more suitably 50-500 kg/t feed of steam is used and particularly suitably 50-400 kg/t feed. Steam is suitably injected at least to one location of the purification vessel/reactor. If the vessel/reactor is arranged vertically the steam is injected suitably to the bottom, or to the middle of the vessel/reactor or to the top of the vessel/reactor. The steam can also be injected to two locations or to the at least three locations: to the bottom, middle and top of the reactor, for providing rapidly sufficient heat to the mixture. Steam provides additionally mixing of the reaction mixture.

The purification is suitably operated such to maintain the structure of the compounds in the feedstock and to avoid hydrolysis of acylglycerols to glycerol as a by-product, in the case acylglycerols were present in the feedstock. Any glycerol formed as by-product is removed with the aqueous stream comprising impurities.

In the purification, phospholipids present in the feedstock are selectively hydrolysed whereby the phosphorus can be found in the aqueous phase and the liberated fatty acid in the oil phase.

In an embodiment, the second stream may be directed to drying for removing residual water in the oil. Drying may be carried out using any suitable drying apparatus, such as decantation, gravitational separation, centrifugation, evaporation apparatus etc.

Optionally, the stream comprising oil (second stream), obtained from the purification may be directed to a fractionation step or to a hydroprocessing step, or to another process.

Optionally, at least part of the first stream is recirculated to the aqueous medium, for use in the purification of the feedstock.

Optionally the recirculated first stream is subjected to a pretreatment step for removing at least part of the impurities, prior to introducing to the recirculation.

Optional Fractionation of the Second Stream

The second stream (stream comprising oil), which has optionally been subjected to drying, may optionally be fractionated in a fractionation step. A gaseous fraction, if any, a light liquid fraction and a heavy liquid fraction may be obtained.

The gaseous fraction typically comprises water and light gaseous (C1-C4) compounds.

The light liquid fraction typically comprises fatty acids having carbon number C4-C26, optionally esters and unsaponifiables, depending on the composition of the feedstock.

The heavy liquid fraction typically comprises C24 and heavier fatty acids, and polymerized compounds.

In an embodiment, the light liquid fraction, obtained by the fractionation of said stream comprising fatty acids, is optionally directed to a hydroprocessing step.

The fractionation of the second stream comprising oil may be carried out as evaporation, distillation or as a combination of evaporation and distillation.

Examples of suitable evaporation methods are those utilizing thin film evaporation technology. The evaporators in the evaporation methods can thus be selected from the group consisting of thin film evaporators, falling film evaporators, short path evaporators, plate molecular stills and any other evaporators using thin film evaporation technology.

The evaporation may be carried out in an evaporation unit, which may comprise one, two, three, four or more evaporators which can be either of the same type or different type and are selected independently from the above listed evaporators. If the evaporation unit comprises more than one evaporator, the evaporators are suitably arranged in series.

Having more than one evaporating steps, provides the advantage that the boiling in the evaporation steps following the first step takes place in a more controlled manner because low boiling light components do not cause so much "carry over", i.e. migrating of the impurities to the vapour.

When two or more evaporators are employed, the temperature is typically increased successively from the first to the second and subsequent evaporators.

Alternatively, the fractionation may be carried out using vacuum distillation methods known in the art. Fractions comprising the gaseous fraction, the light liquid fraction and the heavy liquid fraction can be separated. A person skilled in the art is able to vary the fractionation/distilling conditions and to change the temperature cut point as desired to obtain any desired fraction, boiling in the predetermined ranges.

Alternatively, a combination of the at least one evaporation step or evaporator with vacuum distillation may also be used.

Optional Hydroprocessing Step

The hydroprocessing step may be carried out for effecting at least one of hydrodeoxygenation, hydrodewaxing, hydroisomerization, hydrocracking, hydrodearomatization and ring opening reactions.

In an embodiment, the second stream comprising oil, or a light liquid fraction (typically comprising C4-C26 free fatty acids) obtained by fractionation of the second stream, may be subjected to a catalytic hydroprocessing step carried out in the presence of hydrogen, to yield an effluent, which may be subjected to a second fractionation and/or further processing steps for providing liquid fuels and other chemicals.

Hydroprocessing may be performed using one or more hydroprocessing catalysts comprising one or more metals selected from Group VIA and Group VIII metals (Periodic Table of Elements). Particularly useful examples are Mo, W, Co, Ni, Pt and Pd. The catalyst(s) can also contain one or more support materials, for example zeolite, alumina ($Al_2O_3$), gamma-alumina, zeolite-alumina, alumina-silica ($SiO_2$), $ZrO_2$, alumina-silica-zeolite and activated carbon. Suitably a mixture of CoO and $MoO_3$ (CoMo) and/or a mixture of NiO and $MoO_3$ (NiMo), and/or a mixture of Ni, Mo and Co and/or NiW and one or more support materials selected from zeolite, alumina, silica, zeolite-alumina, alumina-silica, alumina-silica-zeolite and activated carbon. Also, noble metals, such as Pt and/or Pd dispersed on gamma-alumina may be used.

In an embodiment, the hydroprocessing is carried out under a pressure of 5-300 bar (total pressure, abs). In an embodiment, the pressure in the hydroprocessing is from 30 to 250 bar, suitably from 30 to 120 bar.

In an embodiment, hydrogen partial pressure is maintained in the range from 50 to 250 bar, suitably from 80 to 200 bar, particularly suitably from 80 to 110 bar.

The hydroprocessing is carried out at a temperature in the range of 100 to 450° C., suitably 280° C. to 450° C., more suitably from 350° C. to 400° C.

The hydroprocessing feed rate WHSV (weight hourly spatial velocity) of the feedstock oil is proportional to an amount of the catalyst. The WHSV of the feed material varies between 0.1 and 10, it is suitably in the range of 0.1-5 and preferably in the range of 0.3-0.7.

The ratio of H$_2$/feed varies between 600 and 4000 Nl/l, suitably of 1300-2200 Nl/l.

The feed is pumped to the hydroprocessing reactor at a desired speed. Suitably the feed rate LHSV (liquid hourly space velocity) of the feed material is in the range of 0.01-10 h$^{-1}$, suitably 0.1-5 h$^{-1}$.

The hydroprocessing step may be carried out as at least one step or as at least two-step process.

The liquid hydrocarbon stream obtained from the hydroprocessing reactor system includes fuel grade hydrocarbons having a boiling point of at most 380° C. according to ISO EN 3405. The person skilled in the art is able to vary the distilling conditions and to change the temperature cut point as desired to obtain any suitable hydrocarbon product, boiling suitably in the transportation fuel ranges.

The purification process provides several advantageous effects.

The benefits of this process are that it is able to remove particularly effectively phosphorus and alkali metals, alkaline earth metals and other metals from low grade waste materials and residue oils and fats, which contain fatty acids, without producing waste water streams containing significant amounts of dissolved BOD/COD (glycerol), without breaking or degrading valuable feed materials, without effecting hydrolysis of acylglycerols, or at least maintaining said hydrolysis on a very negligible level.

Furthermore, it has a high yield compared to processes utilizing centrifugation and/or absorption in purification. Release of phosphorus in the atmosphere by burning or dumping in the environment can be avoided and low value impure feeds can be converted to useful products.

With the purification process, purified feedstock comprising oil is provided, having low contents of P, Si, metals, alkali metals, alkaline earth metals and other metals, and being particularly suitable as feedstock for catalytic hydroprocessing, where poisoning and inactivation of the catalysts can be avoided, as well as phosphorus promoted harmful side reactions in the hydroprocessing and during storage of the product obtained from the purification of feedstock.

The simple and cost-effective purification process allows the use of flexible feedstocks comprising high amounts of fatty acids and impurities, and the separation of the phases after the purification is easy and economic.

In the embodiment comprising the pretreatment step, materials with moderate corrosion resistance can be used in the process equipment, because sulphuric acid is not used at high temperatures. Impurities including phosphorus, silicon and metals are removed very efficiently. Further, in the embodiment, where separated aqueous phase is recycled to the first stage, any dissolved glycerol is esterified at the prevailing conditions to esters, whereby the amount of dissolved organic carbon (TOC) in the aqueous phase is reduced and said esters can be used as feed to hydroprocessing.

Yield losses are significantly reduced in the purification. The purification process has a high yield compared to processes utilizing degumming, bleaching, centrifugation and/or absorption in purification. Particularly the carbon yield is high, typically at least 98%, indicating that very low amounts of organic compounds are lost in the purification process.

Recycling of the aqueous phase decreases the amount of needed fresh water.

EXAMPLES

Example A

Purification of Soy Acid Oil in a Batch Process

In the test examples 1-11, soy acid oils with different quality were purified in a batch reactor. Soy acid oil was mixed at room temperature with the aqueous medium (distilled water). The oil to water ratio was 1:1. In the test examples 1-3 and 7 no acid was used, in the examples 4-6 citric acid was added to the aqueous medium, and in examples 7-10 sulphuric acid was added to the aqueous medium. The examples were performed using a batch reactor.

The mixture comprising the feedstock and optionally the acid was introduced in the reactor, the reactor was closed and flushed with N$_2$ to remove any air.

The reactor was heated up to the reaction temperature. At the temperatures which was used in the examples, the water was in the liquid phase (the pressure was above the water vapor pressure).

The mixture was mixed using a mixing speed of 500 rpm. After the tests, the reactor was cooled down, the pressure in the reactor was released and the reactor was opened. The two liquid phases, oil phase (second stream) and aqueous phase (aqueous stream comprising impurities), were separated and analyzed.

The oil phase was characterized using GCMS (Gas Chromatography-Mass Spectrometry) to identify the composition and ICP-analysis (ICP=Inductively Coupled Plasma) for the quantification of P, Si and alkali metals, alkaline earth metals and other metals. For the oil phase, also water content was analyzed. The pH and the total organic content (TOC) of the aqueous phase was measured as an indication of the carbon lost to this phase.

Purification results for soya acid oil, with oil/water ratio of 1:1, are presented in table 1 below.

TABLE 1

Purification results for soya acid oil, test example 1-3. Oil/water: 1:1. (One stage process)

| | Unit | Feed Soy acid oil | Ex. 1 T = 150° C., P = 9 bar, 1h Oil | Ex. 2 T = 180° C., P = 11 bar, 1 h Oil |
|---|---|---|---|---|
| Oil phase | | | | |
| Metals* | ppm | 4511.2 | 3725.1 | 3655.7 |
| Si | ppm | 8.3 | 8.3 | 8.3 |
| P | ppm | 225.0 | 35.3 | 1.7 |
| Elemental composition | | | | |
| C | wt-% | 74.0 | 74.6 | 74.5 |
| H | wt-% | 11.9 | 11.9 | 12.0 |
| N | wt-% | 0.08 | 0.08 | 0.12 |
| S | wt-% | 0.0 | 0.0 | 0.0 |
| O | wt-% | 12.7 | 12.6 | 12.4 |
| Water content | % | 1.9 | 2.4 | 2.4 |
| Aqueous phase | | | | |
| Total carbon | mgC/l | | 6647 | 9731 |

*Metals include alkali metals, alkaline earth metals and metals of the groups VIIB and VIIIB of periodic table of elements, in total Purification results for soya acid oil, with oil/water ratio of 1:1, with and without citric acid are presented in table 2 below.

TABLE 2

Citric acid in the purification of soy acid oil. Reaction pressure: 9-12 bar, oil/water: 1. (One stage process)

| Conditions Phase | | Feed Soy acid oil | Ex. 3 T = 180° C., 1 h Citric acid: 0 wt-% Oil | Ex. 4 T = 180° C., 1 h Citric acid: 0.5 wt-% Oil | Ex. 5 T = 180° C., 1 h Citric acid: 1 wt-% Oil | Ex. 6 T = 180° C., 1 h Citric acid: 1.5 wt-% Oil |
|---|---|---|---|---|---|---|
| Metals* | ppm | 4511.2 | 3655.7 | 1046.4 | 190.7 | 51.0 |
| Si | ppm | 8.3 | 10.0 | 8.4 | 9.6 | 10.0 |
| P | ppm | 225.0 | 1.7 | 3.1 | 1.4 | <1 |
| Elemental composition | | | | | | |
| C | wt-% | 74.02 | 74.49 | 73.18 | 74.99 | 75.17 |
| H | wt-% | 11.89 | 12.00 | 11.95 | 12.06 | 12.06 |
| N | wt-% | 0.08 | 0.12 | 0.09 | 0.11 | 0.08 |
| S | wt-% | 0.00 | 0.00 | 0.004 | 0.003 | 0.0013 |
| O | wt-% | 12.68 | 12.42 | 12.76 | 12.39 | 12.53 |
| Water content | wt-% | 1.9 | 2.4 | 1.4 | 1.5 | 1.2 |
| Aqueous phase | | | | | | |
| Total carbon | mgC/l | | 9731 | 10918 | 12551 | 15184 |
| pH | | | 6.2 | 5.7 | 4.8 | 4.1 |

*Metals include alkali metals, alkaline earth metals and metals of the groups VIIB and VIIIB of periodic table of elements, in total (ICP)

Purification results for soya acid oil, with oil/water ratio of 1:1, with and without sulphuric acid are presented in table 3 below.

The results presented in the tables shows that the addition of acid enhances, at the temperature of 180° C., the purification procedure and reduces the TOC in the aqueous phase.

TABLE 3

Sulfuric acid in the purification of soy acid oil; pressure: 9-12 bar, oil/water: 1:1. (One stage process)

| Conditions Phase | | Feed Soya acid oil | Ex. 7 T = 180° C., 1 h Sulfuric acid: 0 wt-% Oil | Ex. 8 T = 180° C., 1 h Sulfuric acid: 0.5 wt-% Oil | Ex. 9 T = 180° C., 1 h Sulfuric acid: 1 wt-% Oil | Ex. 10 T = 180° C., 1 h Sulfuric acid: 1.5 wt-% Oil |
|---|---|---|---|---|---|---|
| Alkaline metals* | ppm | 4511.2 | 3655.7 | 9.1 | 3.1 | 4.3 |
| Si | ppm | 8.3 | 10.0 | 10.0 | <1 | <1 |
| P | ppm | 225.0 | 1.7 | 1.5 | <1 | <1 |
| Elemental composition | | | | | | |
| C | wt-% | 74.02 | 74.5 | 75.2 | 75.19 | 75.33 |
| H | wt-% | 11.89 | 12.0 | 12 | 11.97 | 12.02 |
| N | wt-% | 0.08 | 0.12 | 0.1 | 0.07 | 0.07 |
| S | wt-% | 0.00 | 0.0 | 0.01 | 0.0065 | 0.1058 |
| O | wt-% | 12.68 | 12.4 | 12.43 | 12.26 | 12.33 |
| Water content | wt-% | 1.9 | 2.4 | 1.2 | 1.2 | 1.2 |
| Aqueous phase | | | | | | |
| Total carbon | mgC/l | | 9731 | 5674 | 6663 | 6213 |
| pH | | | 6.2 | 2.4 | 1.2 | 0.8 |

*Metals include alkali metals, alkaline earth metals and metals of the groups VIIB and VIIIB of periodic table of elements, in total (ICP)

Sulfuric acid is particularly suitable. Also, as the pH of the aqueous phase after the purification procedure with sulfuric acid is low, this aqueous phase can be recirculated reducing the amount of fresh water and acid needed.

Example B

Purification of Soy Acid Oil in a Continuous Process

In this example purification of soy acid oil with low alkaline metals and high P concentration was carried in a continuous process. A scheme for the continuous reactor is presented in FIG. 1. Two feed vessels, one for the oil and another for distilled water were used to feed a 50-ml reactor. The vessels were heated to 50-100° C., and to create inner atmosphere and to remove the oxygen dissolved in the oil and water, $N_2$ was bubbled.

Mass flow meters were used to control the feed of oil (10-100 g/l) and water (10-100 g/l) going into the reactor. The oil and water were fed counter currently. The reactor was heated to the operating temperature. The purified oil phase and aqueous phase separate, the purified oil was taken from the top of reactor and the aqueous phase (water containing the impurities) was taken from the bottom of the reactor. As the purified oil contained about 1-5 wt-% water, the oil was dried by decanting, centrifugation, etc. before further processing. The results are presented in Table 4 below.

TABLE 4

Results from continuous operation. (once through)

| | | Operation conditions | | | | | |
|---|---|---|---|---|---|---|---|
| Water | g/h | 20 | 40 | 50 | 40 | 20 | 20 |
| Oil | g/h | 100 | 100 | 20 | 50 | 10 | 50 |
| T | ° C. | 176 | 176 | 176 | 176 | 176 | 176 |

| | | Soy acid oil | Product Oil | | | | |
|---|---|---|---|---|---|---|---|
| Ca | mg/kg | 2 | <0.1 | <0.1 | <0.1 | <0.1 | <0.1 | <0.1 |
| Fe | mg/kg | 2.5 | 0.14 | 0.15 | 0.2 | <0.1 | 0.32 | <0.1 |
| K | mg/kg | 3.6 | <2 | <2 | 4.3 | 2.6 | <2 | <2 |
| Mg | mg/kg | 1.0 | <0.01 | <0.01 | 0.042 | <0.01 | <0.01 | <0.01 |
| Mn | mg/kg | 0.05 | <0.01 | <0.01 | ,.03 | <0.01 | <0.01 | <0.01 |
| Na | mg/kg | 13 | <1 | <1 | 2.6 | 1.7 | <1 | <1 |
| P | mg/kg | 452 | 5.35 | 32.2 | 7.8 | 10.8 | <1 | 1.36 |
| Si | mg/kg | 11.5 | 4.8 | 6.01 | 12.3 | 9.04 | <1 | 2.34 |

In the continuous processing metals can be removed completely and phosphorus present in the feed (452 ppm) can be removed up to values below the detection limits.

Example C

Purification of Soy Acid Oil and Crude Tall Oil in a Process Comprising a Pretreatment Step Soy acid oil and crude tall oil were treated in a process, where the pretreatment step was carried out at 95-140° C. temperature, and 1-5 bar pressure. The treating step was carried out at 160-200° C. temperature and 6-20 bar pressure in a stirred reactor or a countercurrent extraction column. Results are presented in Table 5 below.

TABLE 5

Purification of soy acid oil in a two-stage process.

| | | Feed Soy acid oil | Sulfuric acid: 0.5 wt-% Oil from pretreatment step T = 140° C. | Sulfuric acid: 0 wt-% Oil from stage, T = 180° C. |
|---|---|---|---|---|
| Si | mg/kg | <1 | <1 | <1 |
| P | ppm | 225.0 | 204 | <1 |
| K | ppm | 112 | <2 | <2 |
| Ca | ppm | 393 | 5.3 | 1.3 |
| Fe | ppm | 21 | <0.2 | <0.2 |
| Mg | ppm | 25.6 | 0.2 | 0.3 |
| Mn | ppm | 2.6 | <0.01 | 0.02 |
| Na | ppm | 3978 | 14.5 | 2.3 |

The present invention has been described herein with reference to specific embodiments. It is, however, clear to those skilled in the art that the process(es) may be varied within the bounds of the claims.

The invention claimed is:

1. A process for purifying renewable feedstock comprising at least one fatty acid, wherein said process comprises the steps,
   pretreating the renewable feedstock comprising at least one fatty acid at a temperature of 90-145° C. and under a pressure of 0.1-10 bar (abs), with an aqueous medium comprising an acid selected from sulfuric acid and C1-C10 organic acids, wherein the ratio of the renewable feedstock to the aqueous medium is from 1:5 to 5:1, to provide a first-stage aqueous stream and a first-stage oil stream; and
   treating the first-stage oil stream with water, at a temperature from 150 to 210° C., under a pressure from 5 to 70 bar (abs), where the ratio of the first-stage oil stream to the water is from 1:5 to 5:1, respectively, to provide a first stream comprising water and a second stream comprising oil, and the second stream is obtained as purified renewable feedstock.

2. The process according to claim 1, wherein the renewable feedstock comprising at least one fatty acid is selected from the group consisting of acidulated soap-stocks, fatty acid distillates from physical refining of plant oils or animal fats, distillers corn oil from ethanol production, waste cooking oils, lard, brown grease, trap grease, waste fats, low-grade oils, super critical water liquefaction oils, pyrolysis oils, plant oils, animal fats and combination thereof.

3. The process according to claim 2, wherein the acidulated soap-stocks are selected from acidulated soaps obtained from chemical refining of plant material, acidulated soaps from chemical refining of plant oils, acidulated soaps from chemical refining of animal fats, acidulated soaps from pulp production.

4. The process according to claim 1, wherein the purified renewable feedstock comprises not more than 10 mg/kg phosphorus, calculated as elemental phosphorus.

5. The process according to claim 1, wherein the purified renewable feedstock comprises not more than 10 mg/kg of alkali metals, alkaline earth metals, metals of the groups VIIB and VIIIB of the Periodic table of elements, or combinations thereof, calculated as elemental metals, in total.

6. The process according to claim 1, wherein the first stream comprising water comprises not more than 10 000 mg/kg total organic carbon.

7. The process according to claim 1, wherein the purified feedstock comprises not more than 10 mg/kg calculated as elemental silicon.

8. The process according to claim 1, wherein the purified renewable feedstock comprises not more than 10 mg/kg phosphorus, not more than 10 mg/kg silicon and not more than 10 mg/kg alkali metals, alkaline earth metals, metals of the groups VIIB and VIIIB of the Periodic table of elements, or combinations thereof, and the first stream comprising water comprises not more than 10 000 mg/kg total organic carbon.

9. The process according to claim 1, wherein the aqueous medium comprises 0.01 to 3 wt % of the acid selected from sulphuric acid and C1-C10 organic acids, calculated based on the renewable feedstock comprising fatty acids.

10. The process according to claim 1, wherein the C1-C10 organic acid is EDTA or C1-C6 organic acid selected from citric acid, formic acid, oxalic acid, acetic acid, butyric acid, valeric acid, caproic acid and propionic acid.

11. The process according to claim 1, wherein the acid is sulphuric acid.

12. The process according to claim 1, wherein the first-stage oil stream is treated at a temperature from 150 to 200° C., under a pressure from 5 to 30 bar (abs).

13. The process according to claim 1, wherein in the pretreatment step the temperature is 95-140° C., and the pressure is 0.5-5.5 bar (abs).

14. The process according to claim 1, wherein in the treating step, the temperature is 155-200° C., and the pressure is 6-25 bar (abs).

15. The process according to claim 1, wherein the aqueous medium comprises not more than 3 wt % of organic compounds.

16. The process according to claim 1, wherein the residence time is from 10 min to 12 hours.

17. The process according to claim 1, wherein the pH of the first stream is in the range from 0 to 6.5.

18. The process according to claim 1, wherein the second stream is fractionated to obtain a gaseous fraction, a light liquid fraction and a heavy liquid fraction.

19. The process according to claim 1, wherein at least part of the first stream is recirculated to the aqueous medium.

20. The process according to claim 1, wherein the carbon yield is at least 98%.

21. The process according to claim 2, wherein the acidulated soap-stocks are selected from acid oils and crude tall oil.

22. The process according to claim 1, wherein the purified renewable feedstock comprises not more than 5 mg/kg phosphorus, calculated as elemental phosphorus.

23. The process according to claim 1, wherein the purified renewable feedstock comprises not more than 5 mg/kg of alkali metals, alkaline earth metals, metals of the groups VIIB and VIIIB of the Periodic table of elements, or combinations thereof, calculated as elemental metals, in total.

24. The process according to claim 1, wherein the purified feedstock comprises not more than 5 mg/kg silicon, calculated as elemental silicon.

25. The process according to claim 1, wherein the aqueous medium comprises 0.01 to 3 wt % of organic compounds.

26. The process according to claim 1, wherein the residence time is from 10 min to 7 hours.

27. The process according to claim 1, wherein no acid is added during the treating of the first-stage oil stream.

* * * * *